US010351095B2

(12) United States Patent
Murasaki et al.

(10) Patent No.: US 10,351,095 B2
(45) Date of Patent: Jul. 16, 2019

(54) BUCKLE DEVICE

(71) Applicant: KABUSHIKI KAISHA TOKAI-RIKA-DENKI-SEISAKUSHO, Aichi-ken (JP)

(72) Inventors: Tatsuhiro Murasaki, Aichi-ken (JP); Takuhiro Saito, Aichi-ken (JP); Yasunori Hata, Aichi-ken (JP); Yusuke Watada, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 89 days.

(21) Appl. No.: 15/687,032

(22) Filed: Aug. 25, 2017

(65) Prior Publication Data
US 2018/0056932 A1 Mar. 1, 2018

(30) Foreign Application Priority Data

Aug. 29, 2016 (JP) .................................. 2016-167220

(51) Int. Cl.
B60R 22/03 (2006.01)
B60R 22/20 (2006.01)
(Continued)

(52) U.S. Cl.
CPC .......... *B60R 22/20* (2013.01); *A44B 11/2546* (2013.01); *B60R 22/03* (2013.01); *B60R 2022/1806* (2013.01); *B60R 2022/208* (2013.01)

(58) Field of Classification Search
CPC ......... B60R 22/18; B60R 22/03; B60R 22/20; B60R 22/201; B60R 22/22; (Continued)

(56) References Cited

U.S. PATENT DOCUMENTS 5,634,690 A * 6/1997 Watanabe ........... B60R 22/1952
242/374
6,082,216 A * 7/2000 Watanabe ........... F16H 59/0278
74/473.3
(Continued)

FOREIGN PATENT DOCUMENTS

DE 3316608 A1 * 11/1984 ............. B60R 22/22
DE 3319547 A1 * 12/1984 ............. B60R 22/22
(Continued)

OTHER PUBLICATIONS

Machine Translation DE102006048817; http://translationportal.epo.org/emtp/translate/?ACTION=description-retrieval&COUNTRY=DE&ENGINE=google&FORMAT=docdb&KIND=A1&LOCALE=en_EP&NUMBER=102006048817&OPS=ops.epo.org/3.2&SRCLANG=de&TRGLANG=en; Jan. 15, 2019 (Year: 2019).*
(Continued)

Primary Examiner — Ryan D Kwiecinski
(74) Attorney, Agent, or Firm — Roberts Mlotkowski Safran Cole & Calderon P.C.

(57) ABSTRACT

A lift-up buckle device has a buckle with which is engaged a tongue through which a webbing, which is applied to a vehicle occupant, is inserted; wires that are made of metal, and whose longitudinal direction one end portions are fixed to the buckle, and that move together with the buckle; a driving portion that is connected to longitudinal direction other end portions of the wires, and that move the wires in a longitudinal direction; a wire guide that is made of metal and holds the wires in a curved state; a guide groove that is formed in the wire guide and in which the wires are inserted; and a resin member that is provided at an interior of the guide groove and abuts the wires.

2 Claims, 3 Drawing Sheets

(51) Int. Cl.
*A44B 11/25* (2006.01)
*B60R 22/18* (2006.01)

(58) Field of Classification Search
CPC ...... B60R 2022/1806; B60R 2022/208; A44B 11/2503; A44B 11/2546; A44B 11/2569
See application file for complete search history.

(56) References Cited

U.S. PATENT DOCUMENTS

| | | | | |
|---|---|---|---|---|
| 6,877,776 | B2 * | 4/2005 | Ukita | B60R 22/1952 |
| | | | | 280/806 |
| 8,585,090 | B2 * | 11/2013 | Lane, Jr. | B60R 22/1955 |
| | | | | 280/806 |
| 9,834,174 | B2 * | 12/2017 | Kacprzak | B60R 22/1952 |
| 10,179,562 | B2 * | 1/2019 | Hayashi | B60R 22/18 |
| 2003/0184076 | A1 * | 10/2003 | Devereaux | B60R 22/18 |
| | | | | 280/806 |
| 2004/0232670 | A1 * | 11/2004 | Devereaux | B60R 22/18 |
| | | | | 280/735 |
| 2005/0224270 | A1 * | 10/2005 | Holbein | B60R 22/03 |
| | | | | 180/268 |
| 2016/0031411 | A1 * | 2/2016 | Shimazu | B60R 22/20 |
| | | | | 297/482 |
| 2016/0304050 | A1 * | 10/2016 | Murasaki | A44B 11/2561 |
| 2016/0318473 | A1 * | 11/2016 | Leckliter | B60R 22/18 |
| 2017/0210337 | A1 * | 7/2017 | Matsuzaki | A44B 11/2561 |
| 2017/0225645 | A1 * | 8/2017 | Hayashi | B60R 22/1952 |
| 2017/0232928 | A1 * | 8/2017 | Tatsuma | B60R 22/22 |
| | | | | 280/801.2 |

FOREIGN PATENT DOCUMENTS

| | | | | |
|---|---|---|---|---|
| DE | 9112121 U1 * | 12/1991 | ........... | B60R 22/195 |
| DE | 9015496 U1 * | 4/1992 | ......... | A44B 11/2503 |
| DE | 19641226 A1 * | 5/1997 | ......... | A44B 11/2523 |
| DE | 19641226 C2 * | 4/2002 | ......... | A44B 11/2523 |
| DE | 102004049881 A1 * | 4/2006 | ............ | B60R 22/03 |
| DE | 102006048817 A1 * | 4/2008 | ............ | B60R 22/03 |
| DE | 102008029157 A1 * | 12/2009 | ............ | B60R 22/03 |
| DE | 102011011778 A1 * | 8/2012 | ............ | B60R 22/03 |
| DE | 102011114497 A1 * | 4/2013 | ............ | B60R 22/03 |
| DE | 102011114497 B4 * | 8/2013 | ............ | B60R 22/03 |
| EP | 0655371 A1 * | 5/1995 | ......... | A44B 11/2503 |
| EP | 0655371 B1 * | 8/1997 | ......... | A44B 11/2503 |
| EP | 3081436 A1 * | 10/2016 | ............ | B60R 22/20 |
| EP | 3121067 A2 * | 1/2017 | ......... | A44B 11/2561 |
| EP | 3121067 A3 * | 2/2017 | ......... | A44B 11/2561 |
| EP | 3081436 B1 * | 4/2018 | | |
| JP | S54-166615 | 11/1979 | | |
| JP | S57-47447 | 3/1982 | | |
| JP | S59-22573 Y2 | 7/1984 | | |
| JP | H02-51610 A | 2/1990 | | |
| JP | 3184439 B2 * | 7/2001 | | |
| JP | 2003-054360 A | 2/2003 | | |
| JP | 2012-166786 A | 9/2012 | | |
| JP | 3184439 U * | 6/2013 | ............ | B60R 22/20 |
| JP | 2015-44460 A | 3/2015 | | |
| JP | 2016-22821 A | 2/2016 | | |
| JP | 2016-30589 A | 3/2016 | | |
| JP | 2016-55795 A | 4/2016 | | |
| WO | WO-2004054853 A1 * | 7/2004 | ......... | B60R 22/1953 |
| WO | WO-2004108487 A1 * | 12/2004 | ............ | B60R 22/03 |
| WO | WO-2005102795 A1 * | 11/2005 | ......... | B60R 22/1952 |
| WO | WO-2018108857 A1 * | 6/2018 | ............ | B60R 22/18 |

OTHER PUBLICATIONS

Office Action issued in the corresponding Japanese Application No. 2016-167220 dated Jul. 25, 2017.

Office Action issued in the corresponding Japanese Application No. 2016-167220 dated Dec. 5, 2017.

* cited by examiner

BUCKLE DEVICE

CROSS-REFERENCE TO RELATED APPLICATION

This application claims priority under 35 USC 119 from Japanese Patent Application No. 2016-167220, filed Aug. 29, 2016, the disclosure of which is incorporated by reference herein.

BACKGROUND

Field of the Invention

The present invention relates to a buckle device.

Related Art

As shown in Japanese Patent Application Laid-Open (JP-A) No. 2015-44460, there is known a buckle device having a cable (a connecting member) to whose longitudinal direction one end portion a motor is connected and to whose other end portion a buckle is connected, and that moves the buckle via the cable by driving force of the motor.

In this buckle device, the longitudinal direction central portion of the cable that is made of metal is curved due to it being inserted in a guide path of a curved portion (a guide member) that is made of metal. Therefore, there is the problem that contact noise arises due to contact between the outer peripheral surface of the cable and the inner peripheral surface of the guide path, i.e., between metals, at the time when the cable slides.

SUMMARY

In view of the above-described circumstances, a buckle device that can suppress contact noise between a connecting member and a guide member is provided.

A buckle device of a first aspect has: a buckle with that is configured to engage a tongue through which a webbing, which is applied to a vehicle occupant, is inserted; a connecting member made of metal that moves together with the buckle, one end portion in a longitudinal direction of the connecting member being fixed to the buckle; a driving portion that is connected to another end portion in the longitudinal direction of the connecting member, and that moves the connecting member in the longitudinal direction; a guide member made of metal that holds the connecting member in a curved state; a guide groove that is formed at the guide member and in which the connecting member is inserted; and a protecting member is made of resin that is provided at an interior of the guide groove, and that abuts the connecting member.

In accordance with the above-described structure, the connecting member and the buckle that is fixed to the connecting member are moved in the longitudinal direction by the driving force of the driving portion. At this time, the protecting member, which is made of resin and is provided at the interior of the guide groove of the guide member, abuts the connecting member. Therefore, the guide groove that is made of metal and the connecting member that is made of metal contacting one another so contact noise being generated can be suppressed.

In a buckle device of a second aspect, in the buckle device of the first aspect, a cross-section of the protecting member is U-shaped, and the protecting member has an opening portion at an opening portion side of the guide groove.

In accordance with the above-described structure, the cross-section of the protecting member is U-shaped, and the protecting member has the opening portion which is at the opening portion side of the guide groove. Therefore, the connecting member can be inserted into the protecting member from the opening portion of the guide groove. Thus, insertion of the connecting member into the protecting member and the guide groove is easy.

In a buckle device of a third aspect, the buckle device of the second aspect further has a capping member made of resin that covers the opening portion of the protecting member.

In accordance with the above-described structure, the opening portion of the protecting member is covered by the capping member that is made of resin. Thus, the connecting member, which is inserted in the protecting member, being exposed from the opening portion of the protecting member and contacting another metal member that is disposed at the upper portion of the guide groove or the like, can be suppressed by the capping member.

In a buckle device of a fourth aspect, in the buckle device of the third aspect, a projection, which is fitted in the opening portion of the protecting member, is formed at the capping member.

In accordance with the above-described structure, the projection, which is fit-in the opening portion of the protecting member, is formed at the capping member. Therefore, the peripheral edge portion of the opening portion of the protecting member collapsing-in toward the inner side can be suppressed by the projection.

In accordance with the aspects, contact noise between a connecting member and a guide member can be suppressed.

BRIEF DESCRIPTION OF THE DRAWINGS

Exemplary embodiment will be described in detail with reference to the following figures, wherein.

DETAILED DESCRIPTION

An example of a buckle device relating to an exemplary embodiment is described hereinafter in accordance with FIG. 1 through FIG. 3A and FIG. 3B. Note that, in the following description, when front and rear, left and right, and up and down directions are mentioned, they refer to the directions as seen from a vehicle occupant who is seated in a vehicle seat. Arrow FR that is shown appropriately in the respective drawings indicates the vehicle front side, arrow UP indicates the vehicle upper side, and arrow IN indicates the vehicle transverse direction inner side.

(Overall Structure)

Figure 1:
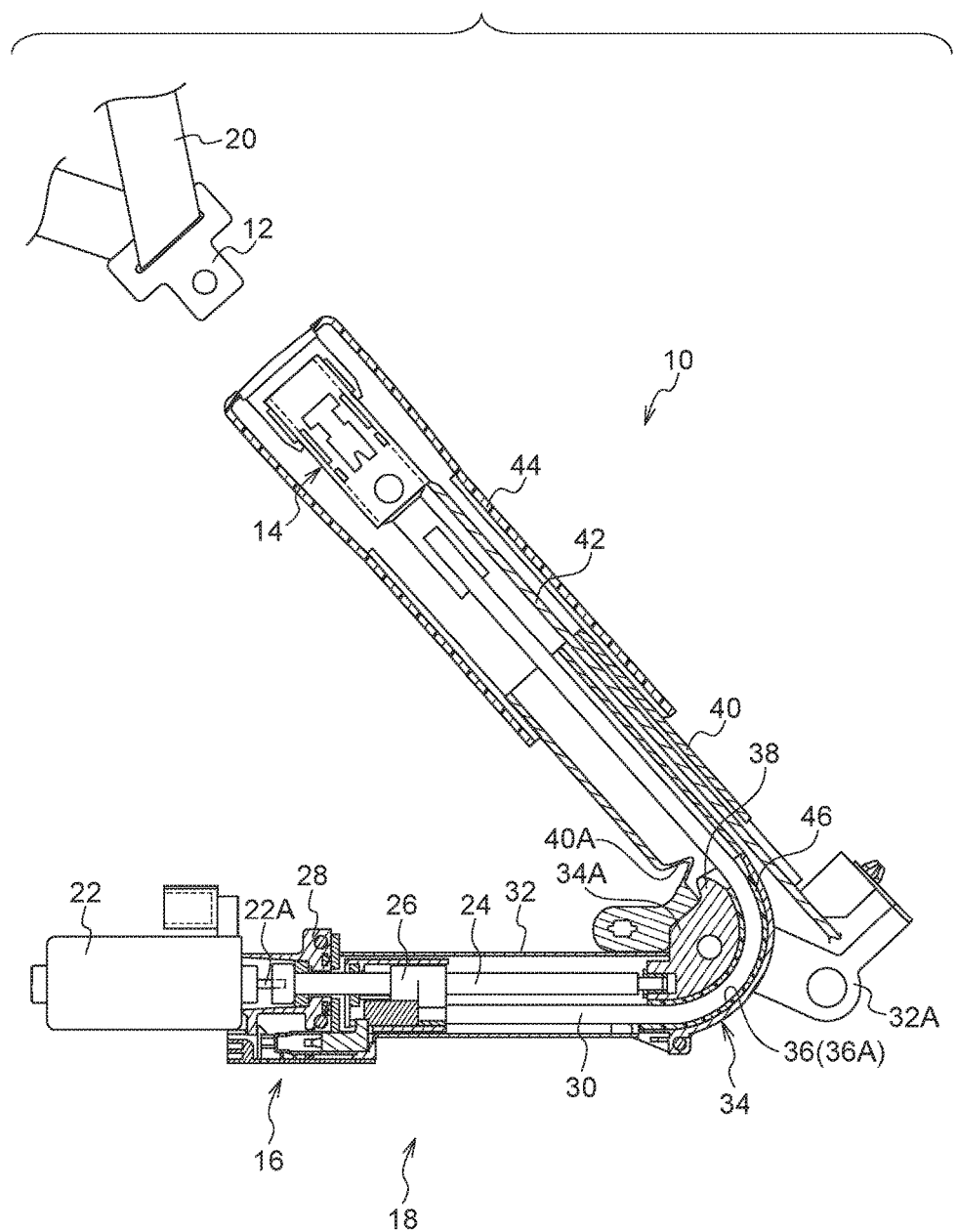
FIG. 1 is a cross-sectional view that is seen from a vehicle transverse direction inner side and shows a buckle device that is an example of an exemplary embodiment.

As shown in FIG. 1, a lift-up buckle device 10 that serves as the buckle device of the present exemplary embodiment has a buckle 14 with which a tongue 12 is configured to be engaged, and a lift-up device 18 having a driving portion 16 that moves the buckle 14 from a housed position to a raised position. Note that a webbing 20 that is applied to a vehicle occupant is inserted-through the tongue 12.

The driving portion 16 has a motor 22, a drive screw 24 whose longitudinal direction one end portion is engaged with an output shaft 22A of the motor 22 so as to be able to rotate integrally therewith, and a slider 26 that is moved in the axial direction of the drive screw 24 accompanying the rotation of the drive screw 24. Note that the motor 22 is a DC motor, and is fixed to a housing 28 that is provided at the vehicle body of the vehicle.

The drive screw 24 is a rod-shaped member that is cylindrical and extends in the vehicle front and rear direction, and an unillustrated male screw is formed in the outer peripheral surface thereof along the longitudinal direction. On the other hand, the slider 26 is a tubular member at whose inner peripheral surface an unillustrated female screw is formed. The female screw of the slider 26 is screwed-together with the male screw of the drive screw 24.

Further, longitudinal direction other end portions of a pair of wires 30 that are made of metal and serve as a connecting member are respectively fixed to the slider 26. The pair of wires 30 are disposed so as to be lined-up in the vehicle transverse direction (see FIG. 3A and FIG. 3B). Longitudinal direction one end portions of the pair of wires 30 are respectively fixed to the buckle 14.

Moreover, a rail 32 that guides the slider 26 is provided at the lift-up device 18. The rail 32 is structured by a steel plate that has a U-shaped cross-section whose lower side is open, and extends in the vehicle front and rear direction along the drive screw 24. Note that the drive screw 24 and the slider 26 are disposed within the rail 32.

A longitudinal direction one portion of the rail 32 is fixed to the housing 28, and a longitudinal direction other end portion of the rail 32 is fixed to the vehicle transverse direction outer side surface of a wire guide 34 that serves as a guide member. The wire guide 34 is a member that is made of metal and is substantially fan-shaped as seen in a side view. A guide groove 36 that has an opening portion 36A is formed in a vehicle transverse direction inner side surface 34A of the wire guide 34.

Note that a longitudinal direction other end portion of the drive screw 24 is rotatably anchored on the wire guide 34. The guide groove 36 is curved in an arc-shape as seen in a side view. A longitudinal direction one end portion of the guide groove 36 opens at the vehicle front side surface of the wire guide 34. A longitudinal direction other end portion of the guide groove 36 opens at the vehicle upper side surface of the wire guide 34.

Note that the longitudinal direction other end portion of the guide groove 36 is made to be a tapered shape at which the inner diameter gradually increases. A chamfered portion 38, which has a curved surface 38A whose curvature is greater than the curvature of the guide groove 36, is formed at vehicle front side portion at the peripheral edge of the guide groove 36 at the vehicle upper side surface of the wire guide 34.

Further, the pair of wires 30 is inserted in the guide groove 36. The direction in which the wires 30 extend is changed due to the wires 30 being curved in an arc-shape along the guide groove 36. Concretely, the axial direction of the wires 30 that extend in the vehicle front and rear direction is changed by the wire guide 34 to a vehicle obliquely upward direction.

A longitudinal direction one end portion of a lower cover 40 is engaged with the vehicle upper side surface of the wire guide 34. The lower cover 40 is a tubular member that is formed of a material that is elastic such as rubber or the like, and extends in a vehicle oblique upward direction. A constricted (neck) portion 40A, which can bend as a starting point of deformation, is formed a vehicle front side portion of the lower cover 40 in a vicinity of the wire guide 34.

The wires 30 and a curled cord 42 connected to an unillustrated buckle switch that is within the buckle 14, is inserted-through the interior of the lower cover 40. An upper cover 44 is slidably supported at a longitudinal direction other end portion of the lower cover 40.

The upper cover 44 is a tubular member that is formed of a resin material or the like that is harder than the lower cover 40, and extends in a vehicle obliquely upward direction along the longitudinal direction of the lower cover 40. The buckle 14 is fixed at the interior of the upper cover 44, and the wires 30 and the curled cord 42 that are connected to the buckle 14 are inserted-through the interior of the upper cover 44.

(Wire Guide)

Figure 3A:
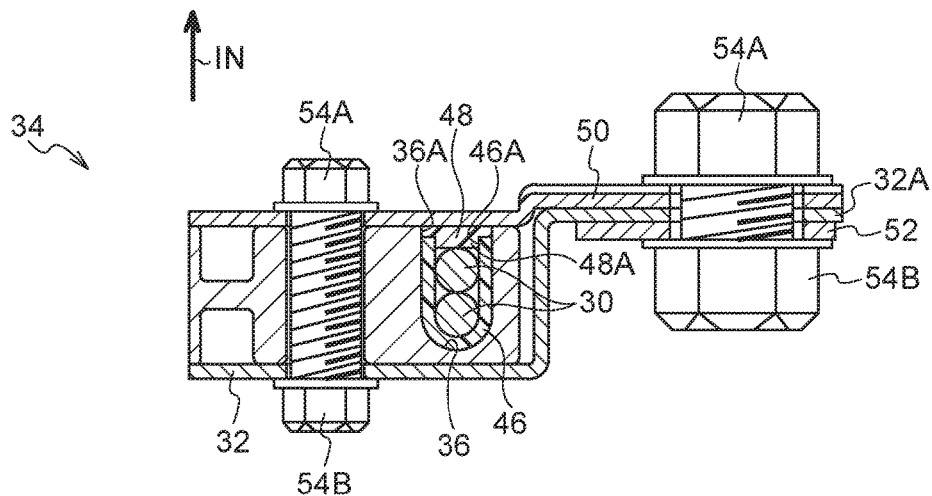
FIG. 3A is a cross-sectional view at line X-X of FIG. 2B.
Figure 3B:
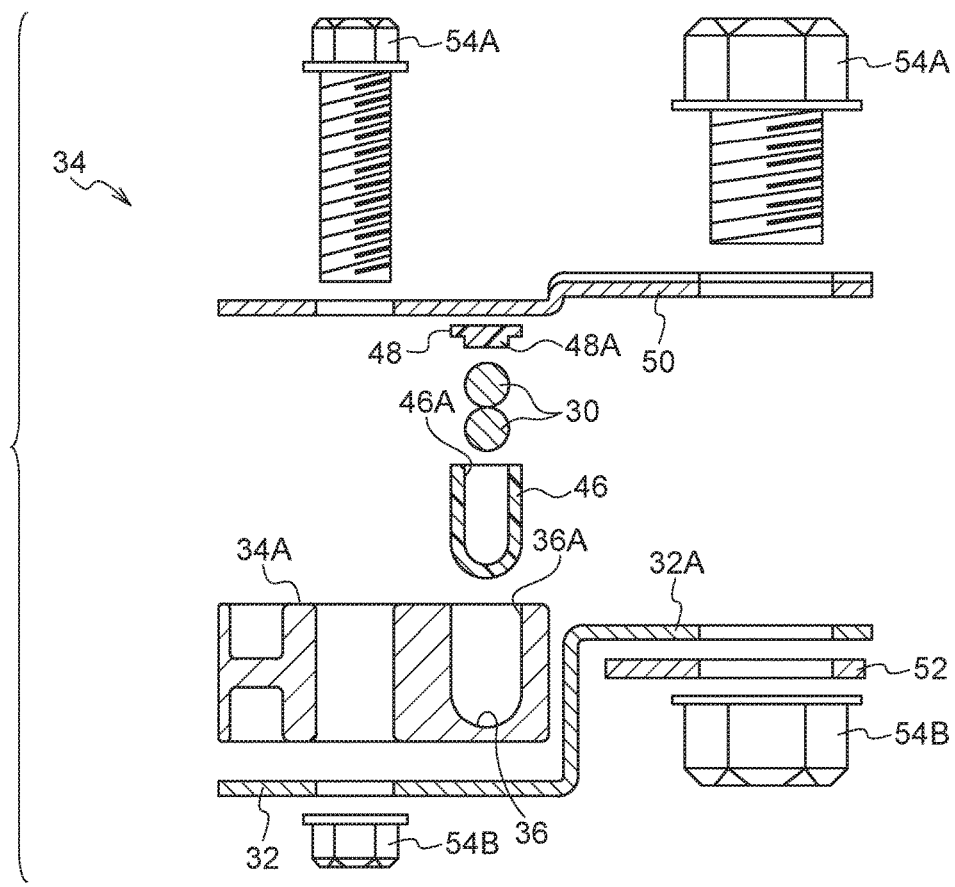
FIG. 3B is an exploded view of FIG. 3A.

As shown in FIG. 3A and FIG. 3B, the cross-section of the guide groove 36 of the wire guide 34 is substantially U-shaped. A resin member 46, which serves as a protecting member and whose cross-section is substantially U-shaped so as to correspond to that of the guide groove 36, is fit-together with the interior of the guide groove 36 along the shape of the guide groove 36. The pair of wires 30 is inserted in the interior of the resin member 46 so as to be parallel to one another in the depth direction of the guide groove 36 (the vehicle transverse direction).

Figure 2A:
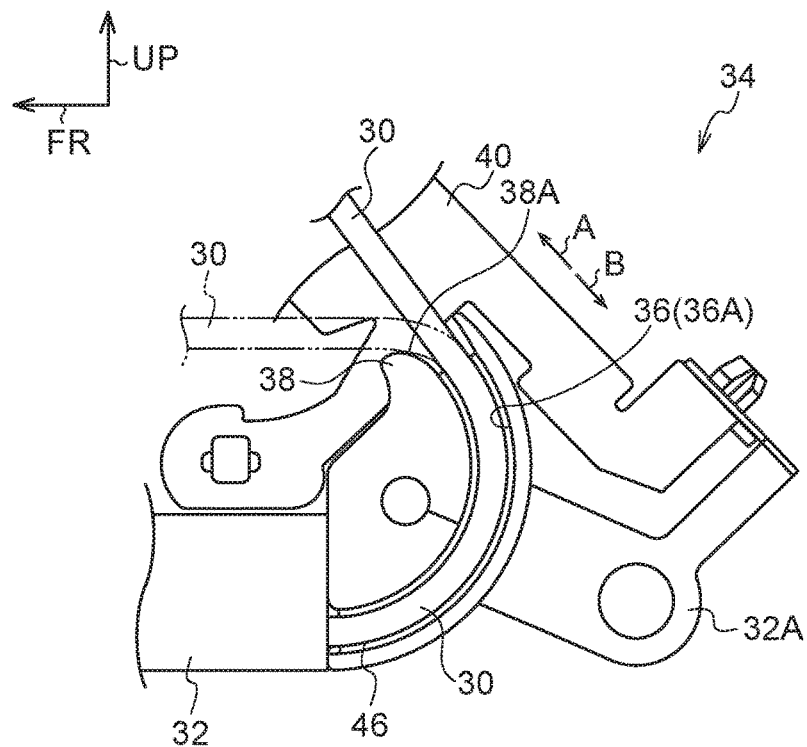
FIG. 2A is an enlarged drawing showing a state in which a cover plate of a guide member of the buckle device has been removed.
Figure 2B:
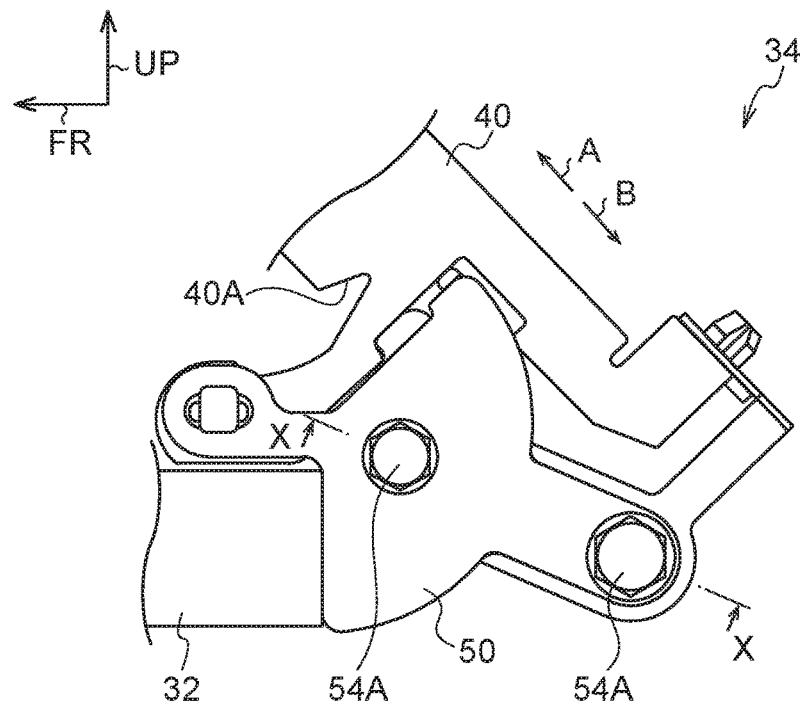
FIG. 2B is an enlarged drawing showing a state in which the cover plate is mounted.

As shown in FIG. 2A, the resin member 46 is curved along the inner peripheral surface of the guide groove 36, and extends over substantially the entire length of the guide groove 36. Note that, as shown in FIG. 3A and FIG. 3B, an opening portion 46A of the resin member 46 is formed at the vehicle transverse direction inner side surface 34A side of the wire guide 34, in the same way as the guide groove 36.

Further, as shown in FIG. 3A and FIG. 3B, the height of the resin member 46 is smaller than the depth of the guide groove 36 (the length from the opening portion 36A to the bottom surface). A capping member 48 is mounted to the resin member 46 so as to cover the opening portion 46A.

The capping member 48 is made of resin, and a projection 48A that is fit-in the opening portion 46A of the resin member 46 is formed at the lower surface of the capping member 48. Note that, at the time of mounting the capping member 48 to the resin member 46, the upper surface of the capping member 48 is made to be in the same plane as the vehicle transverse direction inner side surface 34A of the wire guide 34.

Further, as shown in FIG. 2A, FIG. 3A and FIG. 3B, a cover plate 50 that is made of metal is provided at the vehicle transverse direction inner side (the upper side in FIG. 3A and FIG. 3B) of the wire guide 34. On the other hand, the rail 32 and an extending portion 32A that extends from a longitudinal direction other end portion of the rail 32 are provided at the vehicle transverse direction outer side (the lower side in FIG. 3A and FIG. 3B) of the wire guide 34.

Moreover, a supporting plate 52 that is provided at the floor portion of the vehicle is provided at the vehicle transverse direction outer side of the extending portion 32A. The wire guide 34 is fixed to the vehicle body of the vehicle due to the wire guide 34 being fastened, together with the cover plate 50, the rail 32, the extending portion 32A and the supporting plate 52, by a bolt 54A and a nut 54B in a state in which the resin member 46, the wires 30 and the capping member 48 are inserted in the guide groove 36.

(Operation and Effects)

In the lift-up buckle device 10 of the present exemplary embodiment, when seating of the vehicle occupant in the seat is detected by a detecting portion such as, for example, a load sensor or the like that is provided at the seat of the vehicle, the motor 22 of the lift-up device 18 rotates the drive screw 24 toward one side.

When the drive screw 24 rotates, the slider 26 is guided by the rail 32 and moves toward the vehicle rear side along the drive screw 24. Due thereto, the buckle 14, which is fixed to the longitudinal direction one end portions of the wires 30, is pushed-up in a vehicle obliquely upward direction (the arrow A direction in FIG. 2A and FIG. 2B).

At this time, together with the buckle 14, the upper cover 44 is guided by the lower cover 40 and is pushed-up in a vehicle obliquely upward direction. Due to the buckle 14 being moved from a "lowered position" to a "raised position" in this way, the vehicle occupant can easily engage the tongue 12 with the buckle 14, and can easily apply the webbing 20.

In contrast, when engagement of the tongue 12 with the buckle 14 is detected by the buckle switch, the motor 22 of the lift-up device 18 rotates the drive screw 24 toward another side. When the drive screw 24 rotates, the slider 26 is guided by the rail 32, and moves along the drive screw 24 toward the vehicle front side.

Due thereto, the buckle 14 that is fixed to the longitudinal direction one end portions of the wires 30, and the upper cover 44 to which the buckle 14 is fixed, are pulled-down in a vehicle obliquely lower direction (the arrow B direction in FIG. 2A and FIG. 2B), and the buckle 14 is moved from the "raised position" to the "lowered position".

When the buckle 14 moves between the "raised position" and the "lowered position", the wires 30 slide within the guide groove 36 of the wire guide 34. Here, in the present exemplary embodiment, because the resin member 46 is provided between the wires 30 and the inner peripheral surface of the guide groove 36, the wires 30 and the guide groove 36 that are made of metal directly contacting one another and contact noise being generated can be suppressed.

Further, because the resin member 46 is fit-together with the guide groove 36, curls forming in the wires 30 can be suppressed as compared with a structure in which a protecting member that is made of resin covers the wire 30.

Further, in the present exemplary embodiment, the cross-section of the resin member 46 is substantially U-shaped, and the opening portion 46A of the resin member 46 is formed in the same direction (the vehicle transverse direction inner side surface 34A side of the wire guide 34) as the opening portion 36A of the guide groove 36.

Therefore, the wires 30 can be inserted into the resin member 46, which is provided within the guide groove 36, from the vehicle transverse direction inner side surface 34A side of the wire guide 34. Thus, insertion of the wires 30 into the resin member 46 is easy, as compared with a structure in which the resin member 46 is tubular or the like.

Further, in the present exemplary embodiment, the capping member 48 that is made of resin is mounted to the opening portion 46A of the resin member 46. Therefore, the wires 30 that are inserted within the resin member 46 contacting the cover plate 50, which is fixed to the vehicle transverse direction inner side surface 34A of the wire guide 34, so contact noise being generated can be suppressed by the capping member 48.

Moreover, the projection 48A that is provided at the lower surface of the capping member 48 is fit-in the opening portion 46A of the resin member 46. Thus, collapsing-in, toward the inner side, of the peripheral edge of the opening portion 46A of the resin member 46 can be suppressed by the projection 48A. Note that collapsing, toward the outer side, of the peripheral edge of the opening portion 46A of the resin member 46 can be suppressed by the inner peripheral surface of the guide groove 36.

Note that, in the present exemplary embodiment, at the time of rapid deceleration of the vehicle such as at the time of a vehicle collision or the like, the lower cover 40 bends with the constricted portion 40A being the starting point of deformation, and, as shown by the dashed line in FIG. 2A, the wires 30 (the tongue 12) are pulled toward the vehicle front side. Here, because the longitudinal direction other end portion of the guide groove 36 is formed in a tapered shape, and the chamfered portion 38 is formed at the peripheral edge of the guide groove 36, the wires 30 are curved along the curved surface 38A of the chamfered portion 38.

Thus, as compared with a structure in which the peripheral edge of the guide groove 36 at the vehicle upper side surface of the wire guide 34 is made to be an acute angle, local load on the wires 30 can be kept down, and kinks forming in the wires 30 can be suppressed, and the durability of the wires 30 deteriorating can be suppressed.

Other Exemplary Embodiments

Note that an example of the exemplary embodiment has been described, but the present disclosure is not limited to this exemplary embodiment, and can be implemented in other various ways within the scope of the present disclosure.

For example, in the present exemplary embodiment, the resin member 46 that serves as the protecting member is provided within the guide groove 36 so as to extend along substantially the entire length of the guide groove 36. However, it suffices for the protecting member to be a structure that can suppresses contact between the inner peripheral surface of the guide groove 36 and the wires 30, and, for example, plural protecting members that are spaced apart from one another may be provided within the guide groove.

Further, it also suffices for the shape of the resin member 46 to be a shape that enables sliding of the wires 30 along the interior of the resin member 46, and the resin member may be tubular or the like for example. In this case, because the resin member 46 does not have the opening portion 46A, the capping member 48 is not needed.

What is claimed is:

1. A buckle device comprising:
   a buckle that is configured to engage with a tongue through which a webbing, which is applied to a vehicle occupant, is inserted;
   a connecting member made of metal that moves together with the buckle, one end portion in a longitudinal direction of the connecting member being fixed to the buckle;
   a driving portion that is connected to another end portion in the longitudinal direction of the connecting member, and that moves the connecting member in the longitudinal direction; a guide member made of metal that holds the connecting member in a curved state;
   a guide groove that is formed at the guide member and in which the connecting member is inserted;
   a protecting member is made of resin that is provided at an interior of the guide groove, and that abuts the connecting member, and
   a capping member made of resin that covers the opening portion of the protecting member, wherein a cross-section of the protecting member is U-shaped, and the protecting member has an opening portion at an opening portion side of the guide groove.

2. The buckle device of claim 1, wherein a projection, which is fitted in the opening portion of the protecting member, is formed at the capping member.

* * * * *